US00RE48743E

(19) United States
(12) Reissued Patent
Shalev

(10) Patent Number: US RE48,743 E
(45) Date of Reissued Patent: Sep. 21, 2021

(54) TODDLER FORK

(71) Applicant: ELLI & NOOLI, LLC, Los Angeles, CA (US)

(72) Inventor: Maya Shalev, Los Angeles, CA (US)

(73) Assignee: Elli & Nooli, LLC, Los Angeles, CA (US)

(21) Appl. No.: 29/704,367

(22) Filed: Sep. 4, 2019

Related U.S. Patent Documents

Reissue of:

(64) Patent No.: Des. 799,910
Issued: Oct. 17, 2017
Appl. No.: 29/558,965
Filed: Mar. 23, 2016

(51) LOC (13) Cl. ..... 07-03

(52) U.S. Cl.
USPC ..... D7/653

(58) Field of Classification Search
USPC ..... D7/368, 401.2, 642–645, 653–664, 669, D7/675–677, 683, 688–689, 691; D8/107, 300–301; D21/576, 606–609, D21/625–627; D22/117–118; D24/194, D24/196
CPC ... A01D 9/02; A01D 9/04; A01D 9/06; A47G 21/00; A47G 21/004; A47G 21/005; A47G 21/02; A47G 21/023; A47G 21/04; A47G 21/06; A47G 21/08; A47J 43/28; A47J 43/281; A47J 43/282; A61F 13/10; A61J 7/0023; A46B 5/02; B25G 1/00; B25G 1/01; B25G 1/02; B25G 3/00; B65D 75/56; B65D 75/563; B65D 75/566; B67B 7/00; B67B 7/724; B67B 7/73
See application file for complete search history.

(56) References Cited

U.S. PATENT DOCUMENTS

D148,693 S * 2/1948 Grosvenor ..... D21/406
D336,520 S * 6/1993 McDaniel ..... D24/194
D339,036 S * 9/1993 McDaniel ..... D7/643
D349,770 S * 8/1994 Jarnagin ..... D24/198
(Continued)

*Primary Examiner* — Philip S Hyder
(74) *Attorney, Agent, or Firm* — K&L Gates LLP

(57) CLAIM

The ornamental design for a toddler fork, as shown and described herein.

DESCRIPTION

*More than one reissue application has been filed for the reissue of U.S. Pat. No. D. 799,910. U.S. application Ser. No. 29/729,403, filed Mar. 26, 2020 and U.S. application Ser. No. 29/729,409, filed Mar. 26, 2020 were filed as divisional reissue applications from reissue U.S. application Ser. No. 29/704,367.*

FIG. 4 illustrates a front elevational view of the toddler fork of FIG. 1.

FIG. 5 illustrates a perspective view of the top-side of the toddler fork of FIG. 1; and, FIG. 6 illustrates a perspective view of the bottom-side of the toddler fork of FIG. 1.

Figure 1:
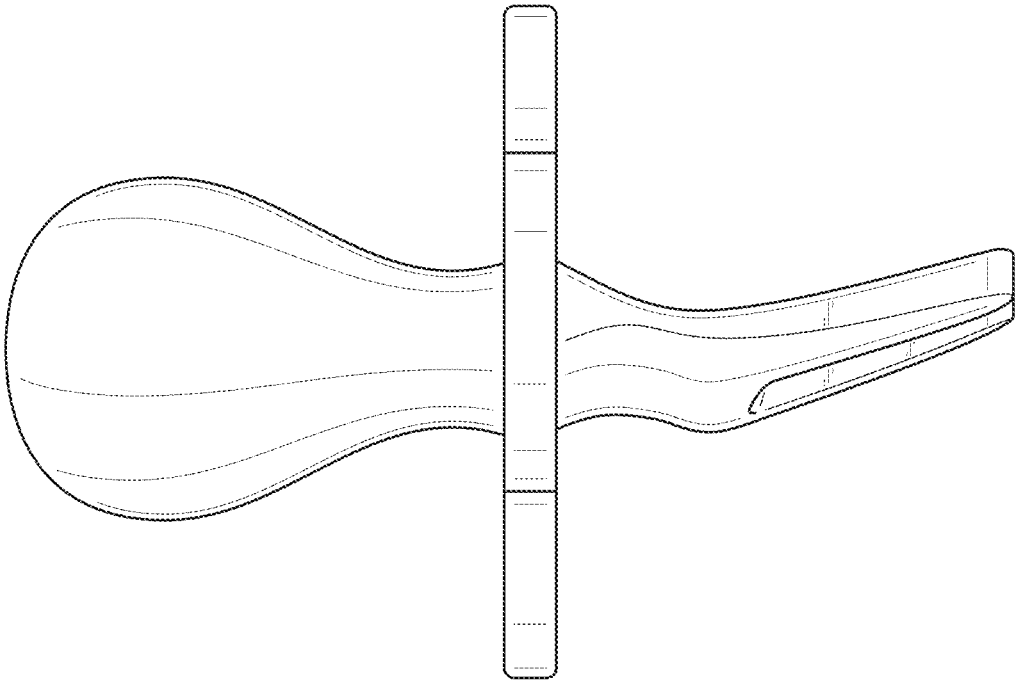
FIG. 1 illustrates a side view of a toddler fork showing my new design, the opposite side view being a mirror image thereof.
Figure 2:
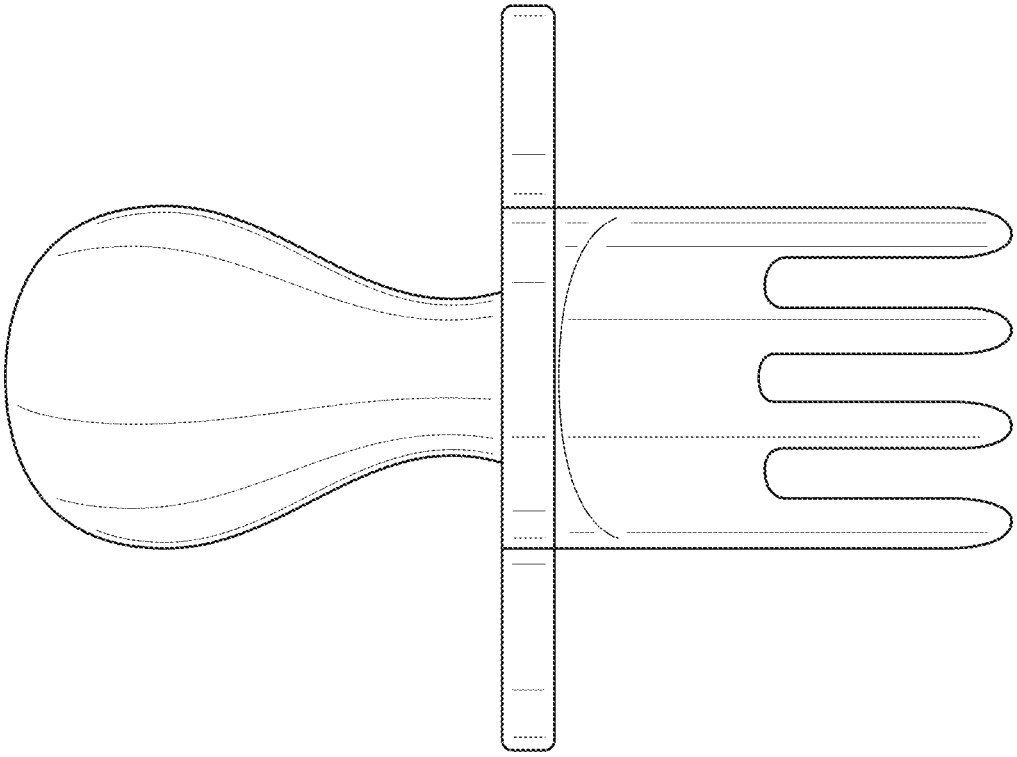
FIG. 2 illustrates a top plan view of the toddler fork of FIG. 1.
Figure 3:
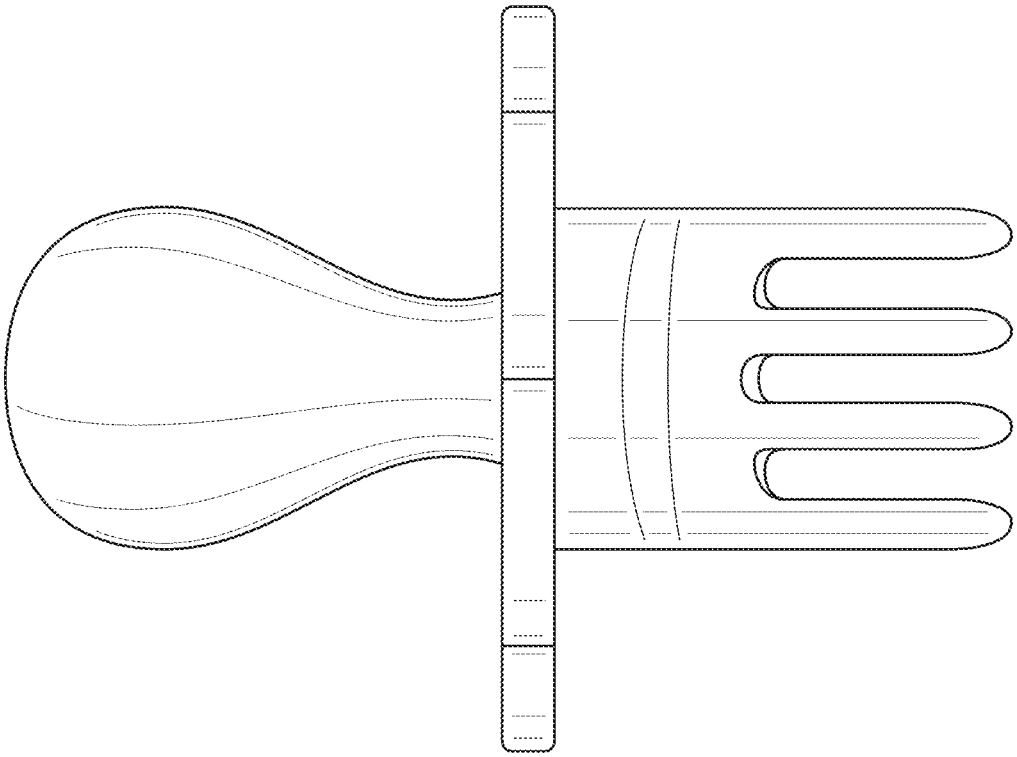
FIG. 3 illustrates a bottom plan view of the toddler fork of FIG. 1.

Any broken lines in the drawings are for illustrative purposes only and form no part of the claimed design. Additionally, the toddler fork is not limited to the scale shown herein.

1 Claim, 6 Drawing Sheets

Matter enclosed in heavy brackets [ ] appears in the original patent but forms no part of this reissue; matter printed in italics indicates the additions made by reissue.

AMENDED

(56) References Cited

U.S. PATENT DOCUMENTS

| | | | | | |
|---|---|---|---|---|---|
| 5,890,223 | A | * | 4/1999 | Klemmer | A47G 21/02 30/150 |
| D413,049 | S | * | 8/1999 | Bergkvist | D7/653 |
| 6,134,790 | A | * | 10/2000 | Watson | A47G 21/02 30/295 |
| D482,248 | S | * | 11/2003 | Roehrig | D7/663 |
| 6,668,415 | B2 | * | 12/2003 | Rohrig | A46B 5/02 15/167.1 |
| D491,420 | S | * | 6/2004 | Shibata | D7/653 |
| D496,833 | S | * | 10/2004 | Lantz | D7/653 |
| D567,383 | S | * | 4/2008 | Rohrig | D24/194 |
| D582,046 | S | * | 12/2008 | Rohrig | D24/194 |
| D592,019 | S | * | 5/2009 | Holcomb | D7/643 |
| D616,557 | S | * | 5/2010 | Roehrig | D24/194 |
| D619,414 | S | * | 7/2010 | Williams | D7/401.2 |
| D641,595 | S | * | 7/2011 | Matari | D7/642 |
| D655,138 | S | * | 3/2012 | Roberts | D7/401.2 |
| D676,718 | S | * | 2/2013 | Rockwell | D7/642 |
| D682,613 | S | * | 5/2013 | De Leo | D7/401.2 |
| D695,361 | S | * | 12/2013 | Roehrig | D21/525 |
| D707,307 | S | * | 6/2014 | Roehrig | D21/525 |
| D790,929 | S | * | 7/2017 | Perez | D7/401.2 |
| D797,525 | S | * | 9/2017 | Garza, Jr. | D7/653 |
| D799,280 | S | * | 10/2017 | Shalev | D7/653 |
| D799,910 | S | * | 10/2017 | Shalev | D7/653 |

* cited by examiner

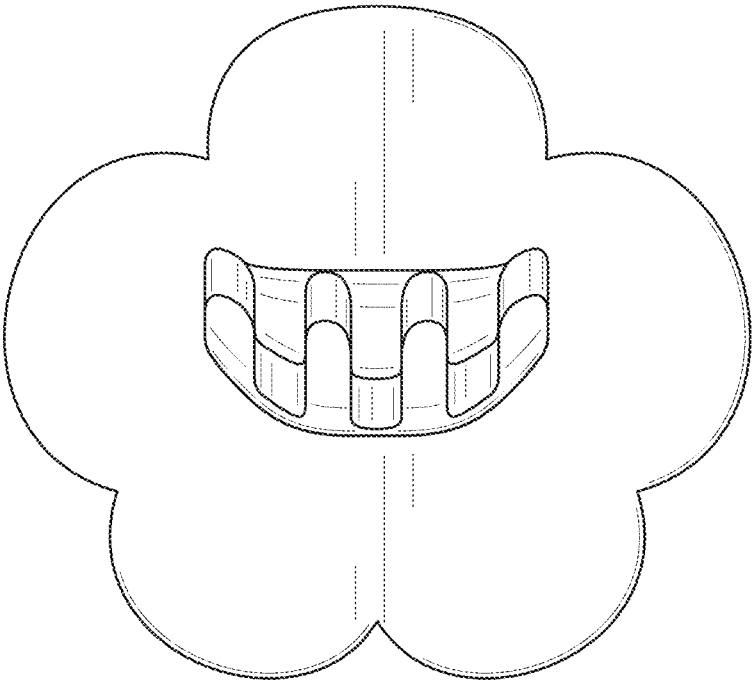
FIG. 4 AMENDED

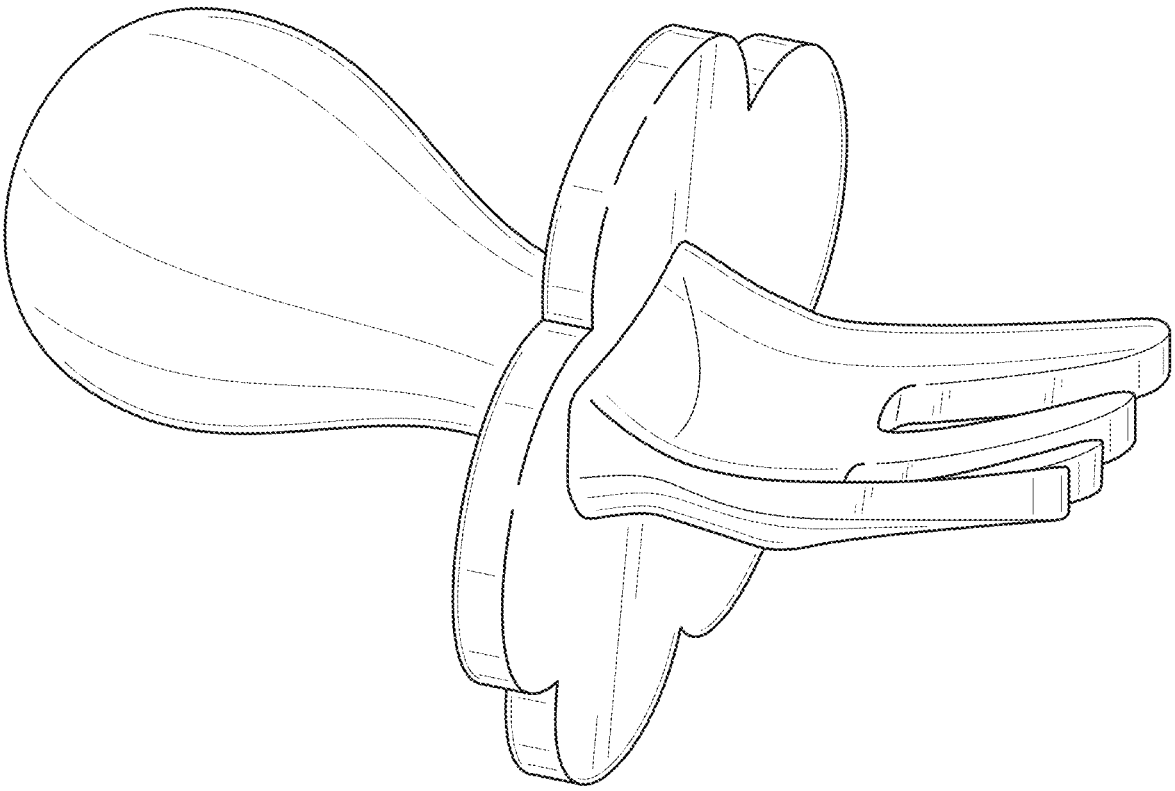
FIG. 5 AMENDED

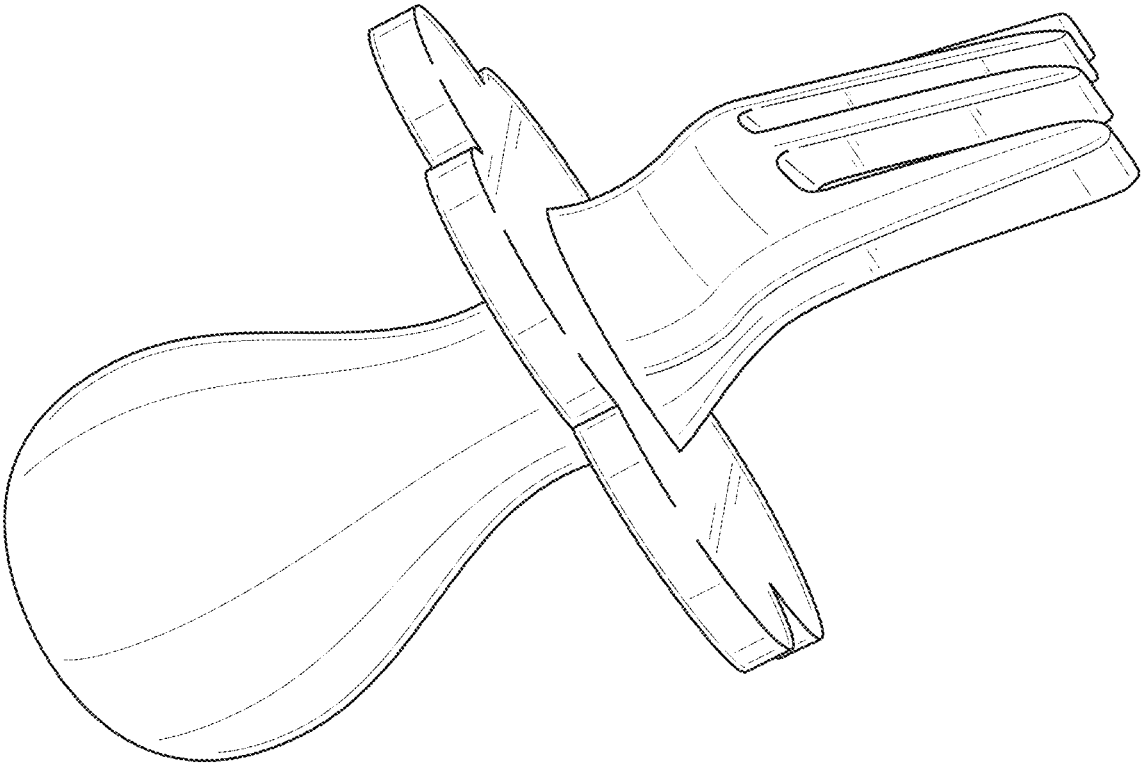
FIG. 6 AMENDED